(12) United States Patent
Perreault et al.

(10) Patent No.: US 9,853,550 B2
(45) Date of Patent: Dec. 26, 2017

(54) SYSTEMS AND METHODS FOR A VARIABLE FREQUENCY MULTIPLIER POWER CONVERTER

(71) Applicant: Massachusetts Institute of Technology, Cambridge, MA (US)

(72) Inventors: David J. Perreault, Andover, MA (US); Khurram K. Afridi, Boulder, CO (US); Samantha J. Gunter, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/435,914

(22) PCT Filed: Oct. 31, 2013

(86) PCT No.: PCT/US2013/067724
§ 371 (c)(1),
(2) Date: Apr. 15, 2015

(87) PCT Pub. No.: WO2014/070998
PCT Pub. Date: May 8, 2014

(65) Prior Publication Data
US 2015/0295497 A1 Oct. 15, 2015

Related U.S. Application Data

(60) Provisional application No. 61/720,715, filed on Oct. 31, 2012.

(51) Int. Cl.
*H02M 3/335* (2006.01)
*H02M 3/337* (2006.01)
(Continued)

(52) U.S. Cl.
CPC ...... *H02M 3/33507* (2013.01); *H02M 1/4241* (2013.01); *H02M 1/44* (2013.01);
(Continued)

(58) Field of Classification Search
CPC ........... Y02B 70/1416; Y02B 70/1433; H02M 2007/4815; H02M 3/335; H02M 3/33507;
(Continued)

(56) References Cited

U.S. PATENT DOCUMENTS 4,513,364 A 4/1985 Nilssen
5,283,727 A 2/1994 Kheraluwala et al.
(Continued)

FOREIGN PATENT DOCUMENTS

DE 103 58 229 A1 7/2005
EP 0 513 920 A2 11/1992
(Continued)

OTHER PUBLICATIONS

PCT International Preliminary Report on Patentability for Appl. No. PCT/US2013/067724 dated May 14, 2015.
(Continued)

*Primary Examiner* — Gary L Laxton
(74) *Attorney, Agent, or Firm* — Daly, Crowley, Mofford & Durkee, LLP

(57) ABSTRACT

A power converter for converting DC power to DC power includes an inverter stage having two or more switched inverters configured to receive DC power from a source and produce a switched AC output power signal. A transformation stage is coupled to receive the switched output power signal from the inverter stage, shape the output power signal, and produce a shaped power signal. A rectifier stage having two or more switched inverters coupled to receive the shaped power signal and convert the shaped power signal to a DC output power signal is included. A controller circuit is (Continued)

coupled to operate the power converter in a variable frequency multiplier mode where at least one of the switched inverters is switched at a frequency or duty cycle that results in an output signal having a frequency that is a harmonic of the fundamental frequency being generated by the power converter.

17 Claims, 14 Drawing Sheets

(51) Int. Cl.
*H02M 1/42* (2007.01)
*H02M 1/44* (2007.01)
*H02M 1/00* (2006.01)

(52) U.S. Cl.
CPC ..... *H02M 3/3376* (2013.01); *H02M 3/33523* (2013.01); *H02M 2001/0048* (2013.01); *H02M 2001/0054* (2013.01); *H02M 2001/0058* (2013.01); *H02M 2001/0074* (2013.01); *H02M 2001/0077* (2013.01); *Y02B 70/1491* (2013.01)

(58) Field of Classification Search
CPC ............. H02M 3/33569; H02M 3/325; H02M 3/33576; H02M 3/33592
See application file for complete search history.

(56) References Cited

U.S. PATENT DOCUMENTS

| | | | |
|---|---|---|---|
| 5,959,565 A | 9/1999 | Taniuchi et al. | |
| 6,198,645 B1 | 3/2001 | Kotowski et al. | |
| 6,301,128 B1* | 10/2001 | Jang | H02J 5/005 363/127 |
| 6,362,979 B1* | 3/2002 | Gucyski | H02M 7/4807 363/17 |
| 6,411,527 B1* | 6/2002 | Reinold | H02M 3/28 363/17 |
| 6,515,612 B1 | 2/2003 | Abel | |
| 6,563,235 B1 | 5/2003 | McIntyre et al. | |
| 7,157,956 B2 | 1/2007 | Wei | |
| 7,375,992 B2 | 5/2008 | Mok et al. | |
| 7,382,113 B2 | 6/2008 | Wai et al. | |
| 7,382,634 B2 | 6/2008 | Buchmann | |
| 7,535,133 B2 | 5/2009 | Perreault et al. | |
| 7,589,605 B2 | 9/2009 | Perreault et al. | |
| 7,596,002 B2 | 9/2009 | Teichmann | |
| 7,633,778 B2 | 12/2009 | Mok et al. | |
| 7,777,459 B2 | 8/2010 | Williams | |
| 7,812,579 B2 | 10/2010 | Williams | |
| 7,889,519 B2 | 2/2011 | Perreault et al. | |
| 7,907,429 B2 | 3/2011 | Ramadass et al. | |
| 7,956,572 B2 | 6/2011 | Zane et al. | |
| 8,000,117 B2 | 8/2011 | Petricek | |
| 8,026,763 B2 | 9/2011 | Dawson et al. | |
| 8,085,524 B2 | 12/2011 | Roozeboom et al. | |
| 8,164,384 B2 | 4/2012 | Dawson et al. | |
| 8,169,795 B2* | 5/2012 | Petersen | H03F 3/217 323/222 |
| 8,212,541 B2 | 7/2012 | Perreault et al. | |
| 8,351,230 B2* | 1/2013 | Nishihara | H02M 1/08 363/21.02 |
| 8,451,053 B2 | 5/2013 | Perreault et al. | |
| 8,643,347 B2 | 2/2014 | Giuliano et al. | |
| 8,659,353 B2 | 2/2014 | Dawson et al. | |
| 8,718,188 B2 | 5/2014 | Balteanu et al. | |
| 8,824,978 B2 | 9/2014 | Briffa et al. | |
| 8,829,993 B2 | 9/2014 | Briffa et al. | |
| 8,830,709 B2 | 9/2014 | Perreault et al. | |
| 8,830,710 B2 | 9/2014 | Perreault et al. | |
| 8,957,727 B2 | 2/2015 | Dawson et al. | |
| 2003/0227280 A1 | 12/2003 | Vinciarelli | |
| 2004/0041620 A1 | 3/2004 | D'Angelo et al. | |
| 2004/0222775 A1 | 11/2004 | Muramatsu et al. | |
| 2005/0088865 A1 | 4/2005 | Lopez et al. | |
| 2005/0213267 A1 | 9/2005 | Azrai et al. | |
| 2005/0286278 A1 | 12/2005 | Perreault et al. | |
| 2007/0091655 A1 | 4/2007 | Oyama et al. | |
| 2007/0146020 A1 | 6/2007 | Williams | |
| 2007/0171680 A1 | 7/2007 | Perreault et al. | |
| 2008/0013236 A1 | 1/2008 | Weng | |
| 2008/0031023 A1 | 2/2008 | Kitagawa et al. | |
| 2008/0062724 A1 | 3/2008 | Feng et al. | |
| 2008/0157733 A1 | 7/2008 | Williams | |
| 2008/0158915 A1 | 7/2008 | Williams | |
| 2009/0072800 A1 | 3/2009 | Ramadass et al. | |
| 2009/0102439 A1 | 4/2009 | Williams | |
| 2009/0147554 A1 | 6/2009 | Adest et al. | |
| 2009/0273955 A1 | 11/2009 | Tseng et al. | |
| 2009/0303753 A1 | 12/2009 | Fu et al. | |
| 2010/0085786 A1 | 4/2010 | Chiu et al. | |
| 2010/0117612 A1 | 5/2010 | Klootwijk et al. | |
| 2010/0308751 A1 | 12/2010 | Nerone | |
| 2011/0069514 A1 | 3/2011 | Chiba | |
| 2013/0241625 A1 | 9/2013 | Perreault et al. | |
| 2014/0118065 A1 | 5/2014 | Briffa et al. | |
| 2014/0118072 A1 | 5/2014 | Briffa et al. | |
| 2014/0120854 A1 | 5/2014 | Briffa et al. | |
| 2014/0167513 A1 | 6/2014 | Chang et al. | |
| 2014/0225581 A1 | 8/2014 | Giuliano et al. | |
| 2014/0226378 A1 | 8/2014 | Perreault | |
| 2014/0313781 A1 | 10/2014 | Perreault et al. | |
| 2014/0335805 A1 | 11/2014 | Briffa et al. | |
| 2014/0339918 A1 | 11/2014 | Perreault | |
| 2014/0355322 A1 | 12/2014 | Perreault et al. | |
| 2015/0023063 A1 | 1/2015 | Perreault et al. | |
| 2015/0084701 A1 | 3/2015 | Perreault et al. | |

FOREIGN PATENT DOCUMENTS

| | | |
|---|---|---|
| JP | 2012085465 A | 10/2001 |
| JP | 2002-62858 | 2/2002 |
| JP | 2004235094 A | 8/2004 |
| JP | 2012085465 A | 4/2012 |
| WO | WO2013086445 A1 | 6/2013 |

OTHER PUBLICATIONS

U.S. Appl. No. 14/758,033, filed Jun. 26, 2015, Perreault, et al.
U.S. Appl. No. 14/791,685, filed Jul. 6, 2015, Perreault, et al.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/401,981, filed Nov. 18, 2014, Perreault.
U.S. Appl. No. 14/416,654, filed Jan. 23, 2015, Perreault, et al.
U.S. Appl. No. 14/619,737, filed Feb. 11, 2015, Perreault, et al.
U.S. Appl. No. 14/666,965, filed Mar. 24, 2015, Briffa, et al.
Abutbul, et al.; "Step-Up Switching-Mode Converter with High Voltage Gain Using a Switched-Capacitor Circuit;" IEEE Transactions on Circuits and Systems-1: Fundamental Theory and Applications; vol. 50, No. 8; Aug. 2003; pp. 1098-1102.
Axelrod, et al.; "Single-Switch Single-Stage Switched-Capacitor Buck Converter;" 4th Nordic Workshop on Power and Industrial Electronics; Jun. 2004; 5 pages.
Giuliano, et al.; "Architectures and Topologies for Power Delivery;" Biannual Review of MIT Center for Integrated Circuits; Power Point Presentation; May 9, 2007; 17 slides.
Ma, et al.; "Design and Optimization on Dynamic Power Systems for Self-Powered Integrated Wireless Sensing Nodes;" Low Power Electronics and Design, 2005; ISLPED 05; Proceedings of the 2005 International Symposium; Aug. 8-10, 2005; pp. 303-306.
Maxim; Triple-Output TFT-LCD DC-DC Converters; MAX1748/ MAX8726; 19/3430; Rev 0; Oct. 2004; pp. 1-16.
Ottman, et al; "Optimized Piezoelectric Energy Harvesting Circuit Using Step-Down Converter in Discontinuous Conduction Mode;" Power Electronics Specialists Conference, 2002; pesc 02. 2002; IEEE 33rd Annual; vol. 4; Jun. 23-27, 2002; pp. 1988-1994.

(56) References Cited

OTHER PUBLICATIONS

Sun, et al.; "High Power Density, High Efficiency System Two-Stage Power Architecture for Laptop Computers;" 37th IEEE Power Electronics Specialists Conference apros; 06; Jun. 18, 2006; 7 pages.
Wood, et al.; "Design, Fabrication and Initial Results of a 2g Autonomous Glider;" Industrial Electronics Society, IECON 2005; 31st Annual Conference of IEEE: Nov. 6-10, 2005; pp. 1870-1877.
Xu, et al; Voltage Divider and its Application in the Two-stage Power Architecture; Applied Power Electronics Conference and Exposition 2006; APEC 06; Twenty-First Annual IEEE: Mar. 19-23, 2006; pp. 499-505.
PCT Search Report and Written Opinion of the ISA dated Mar. 27, 2014; for PCT Pat. App. No. PCT/US2013/067724; 12 pages.
Japanese Office Action (with English translation) dated Mar. 22, 2016; for Japanese Pat. App. No. 2015-539956; 9 pages.
Notice of Preliminary Rejection (with English translation) dated Apr. 18, 2016; for Korean Pat. App. No. 10-2015-7011113; 11 pages.
Coccia et al., "Wide Input Voltage Range Compensation in DC/DC Resonant Architectures for On-Board Traction Power Supplies"; ABB Industrie; *IEEE*, 2007; 10 pages.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
U.S. Appl. No. 15/149,491, filed May 9, 2016, Perreault et al.
Notice of Allowance dated Feb. 1, 2017 from Korean Pat. App. No. 10-2015-7011113 with English language translation of allowed claims; 7 Pages.
Final Office Action dated Feb. 9, 2017 from U.S. Appl. No. 15/149,491; 10 Pages.
Coccia, et al.; "Wide Input Voltage Range Compensation in DC/DC Resonant Architectures for On-Board Traction Power Supplies;" IEEE Xplore; Sep. 2-5, 2007; 10 pages.
European Extended Search Report for EP Appl. No. 13851504.4 dated Nov. 24, 2016; 6 pages.
European Communication Pursuant to Rules 70(2) and 70a(2) EPC dated Dec. 13, 2016; 1 page.
Chinese Office Action for Chinese Appl. No. 201380056648.4 dated Nov. 2, 2016; 22 pages.
River, et al.; "High Performance DC-DC Converter for Wide Voltage Range Operation;" 2012 IEEE 7th International Power Electronics and Motion Control Conference; Jun. 2-5, 2012; 8 pages.
Japanese Response with (English claims) filed on Sep. 26, 2016 to the Office Action dated Mar. 22, 2016; for Japanese Pat. App. No. 2015-539956; 9 pages.
Non-Final Office Action dated Aug. 26, 2016; for U.S. Appl. No. 15/149,491; 19 pages.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa et al.
Response filed Nov. 23, 2016 to the Non-Final Office Action dated Aug. 26, 2016; for U.S. Appl. No. 15/149,491; 10 pages.
Second Office Action dated Jul. 10, 2017 from International Application No. 201380056648.4; 21 Pages.
Response to the communication under Rule 70 dated Dec. 13, 2016 as filed on Jun. 23, 2017; 2 Pages.
Japanese Office Action dated Feb. 27, 2017 for Patent Application No. 2015-539956 with English Translations of Office Action and Claims; 10 Pages.
Chinese Second Office Action with English Translations dated Jul. 10, 2017 from Application No. 201380056648.4; 21 Pages.
Notice of Allowance dated Sep. 25, 2017 from U.S. Appl. No. 15/149,491; 12 Pages.

\* cited by examiner

SYSTEMS AND METHODS FOR A VARIABLE FREQUENCY MULTIPLIER POWER CONVERTER

CROSS-REFERENCE TO RELATED APPLICATIONS

This application is a U.S. National Stage application (filed under 35 U.S.C. §371) of PCT application PCT/US2013/067724 (filed Oct. 31, 2013). This application claims priority to and benefit of PCT application PCT/US2013/067724 and U.S. Provisional Application No. 61/720,715 (filed Oct. 31, 2012). All applications and documents listed in this section are incorporated here by reference in their entireties.

BACKGROUND

As is known in the art, power electronics is a key technology for addressing the energy challenges. Improvements in performance of power electronics coupled with their expanded use could lead to dramatic reductions in electricity consumption (as much as 20-30% by some estimates). However, achieving such reductions in electricity consumption requires systems having increased efficiency while at the same time being smaller and less expensive than existing systems. Such power electronics are important both for reducing consumption of energy (though the improved capability and efficiency of loads and sources) and for improving the efficiency of an electrical grid itself (e.g., though improvements in power factor). Presently, power electronics at a grid-interface level efficiencies typically in the range of about 70-90% at full load. Furthermore, this efficiency typically falls off rapidly at reduced loads, such that average efficiency, as well as losses, are lower than the 70%-90% range. It has been estimated, for example, that power supply losses account for 20 to 70% of all energy that electronic products consume. Likewise, poor power factor is estimated to be indirectly responsible for as much as 2.8% of energy consumption in commercial buildings. There is thus a need to provide power electronics having improved peak and average efficiencies, an improved power factor and also having reduced size, weight and cost to enable greater adoption and utilization.

One area in which such improvements can be made is in power supplies that provide the interface between high-voltage DC or AC inputs (i.e., grid-scale voltages) and low-voltage DC outputs. This includes supply of energy from an AC grid to DC loads such as computers, electronic devices and LED lighting, which represents both a large use of electrical energy and a place where substantial energy is presently lost. It has been reported that over 28% of domestic electrical energy usage goes into "miscellaneous" loads—including electronic devices with power supply front ends. Furthermore, the percentage of energy going to electronic loads is growing at twice the rate of other loads. As much as 4% of the entire U.S. national energy consumption can be traced to power supply losses for electronic loads, owing largely to poor average power supply efficiencies. Moreover, the lack of power factor correction in most power supplies yields additional indirect (system-level) losses that can be quite substantial. This represents a tremendous waste of energy and the generation of unnecessary emissions.

Improved power conversion is also important for DC-input systems. DC distribution (nominally at 380 V DC) is sometimes considered an alternative to AC distribution in commercial buildings and data centers, as it offers higher efficiency, more effective management of power factor correction, and easier integration of distributed renewable sources and energy storage. For example, early demonstrations have shown that 380 V DC distribution architectures can result in energy savings of around 15% over standard 208 V AC distribution in data centers. This is due to the higher distribution voltage and fewer voltage conversion stages required in DC distribution systems.

The effectiveness of DC distribution depends, at least in part, upon DC-DC converters that convert the voltage from 380 V (actually 260 V-410 V) to the lower voltages needed for lighting and electronic loads. In data centers, where such DC distribution architectures are expected to be first deployed, the 380 V DC source will need to be converted to 12 V using a DC-DC converter located in each "rack" (i.e. a frame or enclosure for mounting multiple equipment module) to power the servers. To reduce cost in such an architecture, extremely high-efficiency converters (e.g., converter having efficiencies in the range of 97% and above) will be needed.

High-performance power converters that deliver energy from high-voltage DC or AC sources to low-voltage DC loads, with input voltages consistent With the AC grid (e.g., up to 240 V AC) and DC distribution systems (260-410 V DC) and output voltages of volts to tens of volts, achieve efficiencies of up to 90-95% (5-10% loss) with much lower average efficiencies. Technologies that achieve greater efficiency, power factor, and miniaturization of power converters that deliver energy from high-voltage DC or AC sources to low-voltage DC loads can be difficult to design, as the high input voltage and large voltage conversion ratios can result in large semiconductor switch and magnetic core losses (e.g., in transformers and inductors), and the wide operating ranges of input voltage (e.g., 1.6:1 or more) and power (e.g., 10:1 or more) place constraints on many design techniques.

One technique for achieving high efficiency power conversion within a switched converter includes using zero-voltage switching ("ZVS"), in which the transistor voltage is constrained close to zero when the transistor switches on or off, and/or zero-current switching ("ZCS"), in which the transistor current is constrained close to zero when the transistor switches on or off. Without soft switching, transistor switching loss can reduce the efficiency of the converter and limits power density.

Unfortunately, while available soft-switching circuits can achieve very high efficiencies under specific operating conditions, performance tends to degrade greatly when considering requirements of operation across widely varying input voltage and power levels. In particular, with conventional circuit designs and control methods, it is difficult to maintain desirable circuit waveforms (e.g., ZVS/ZCS switching, minimum conduction current, etc.) as power is reduced from maximum and as the input voltage varies from nominal.

For example, one technique for controlling resonant soft-switched inverters (e.g., series, parallel, series-parallel, LLC converters, etc.) is a frequency control technique, in which an output voltage is regulated in the face of load and input voltage variations by modulating a converter switching frequency. Because of the inductive loading requirements to achieve ZVS switching which is important at high voltage levels, power is reduced in such converters by increasing switching frequency, which can exacerbate switching loss. Wide frequency operation also makes design of magnetic components and EMI filters more challenging. Moreover, depending upon resonant tank design, circulating currents in the converter may not back off with power, reducing power transfer efficiency.

An alternative method that can be applied to bridge converters at fixed frequency is phase-shift control, in which the relative timing of multiple inverter legs are modulated to control power. However, conventional full-bridge resonant converters using phase shift control suffer from asymmetric current levels between the two inverter legs at the time of switching as the legs are outphased to reduce output power. The result is that the transistors in the leading inverter leg start to turn-off at large currents. Also, as outphasing is increased, the transistors in the lagging inverter leg lose ZVS turn-on capability. These factors result in extra losses and lead to lower converter efficiency at partial loads, and consequently to poor design tradeoffs.

Other fixed frequency control techniques, such as asymmetrical clamped mode control and asymmetrical pulse width control, have also been developed. However, these techniques also lose zero voltage switching (ZVS) capability as the output power is reduced. Hence, they also do not maintain high efficiency across a wide load range. There is an evident need for circuit designs and associated controls that can provide reduced loss when operating over wide input voltage and power ranges, and which can provide large step-down voltage conversion.

Frequency multiplier circuits can be used in extremely high-frequency RF applications and are sometimes used in switched-mode inverters and power amplifiers. Frequency multiplier circuits are not typically used in DC-DC converters, however, because the output power of a frequency multiplier inverter is inherently low relative to required device ratings.

SUMMARY

In accordance with the concepts, systems and techniques described herein, a DC-DC power converter includes an inverter stage having two or more switched inverters configured to receive DC power from a source and produce a switched AC output power signal. A transformation stage is coupled to receive the switched output power signal from the inverter stage, shape the output power signal, and produce a shaped power signal, the transformation stage having a fundamental frequency of operation. A rectifier stage having two or more switched inverters is coupled to receive the shaped power signal and convert the shaped power signal to a DC output power signal. A controller circuit is configured to operate the inverter and/or rectifier in a variable frequency multiplier mode.

With this particular arrangement, a variable frequency multiplier ("VFX") power converter is provided. By providing the power converter having inverter and/or rectifier stages capable of operating at both a fundamental switch frequency mode and a harmonic switch frequency mode, the VFX power converter is provided having an efficiency characteristic across a wide load range which is higher than of characteristics of prior art power converters across the same load range. Moreover, in one embodiment, when operating over wide input voltage and power ranges, the VFX power converter described herein is provided having a loss characteristic which is reduced compared with loss characteristics of prior art power converters operating over the same wide input voltage and power ranges. Further still, in one embodiment, the VFX power converter described herein can also provide a step-down voltage conversion which is relatively large compared with step town voltage conversions of prior art power converters.

In another embodiment, a DC-DC power converter includes an inverter stage having two or more switched inverters configured to receive DC power at an input thereof and to produce a switched AC output power signal at an output thereof. A transformation stage receives the switched output power signal from the inverter stage output and shapes the output power signal to produce a shaped power signal at an output thereof. A rectifier stage having two or more switched inverters receives the shaped power signal at an input thereof and converts the shaped power signal to a DC output power signal at an output thereof. A controller circuit is coupled to operate the power converter in a variable frequency multiplier mode where at least one of the switched inverters in the inverter stage or the rectifier stage is switched at a frequency or duty cycle that results in an output signal having a frequency that is a harmonic of the fundamental frequency being generated by the power converter. In some embodiments at least one of the switched inverters in both the inverter stage and the rectifier stage are switched at a harmonic frequency or duty cycle.

With this particular arrangement, a power converter capable of multiple modes of operation is provided. By switching inverters using a fundamental of a switching frequency, the power converter operates to provide maximum output voltage (or power) mode. By switching inverters using a harmonic of the switching frequency, the power converter enters a lower power mode of operation. It should be appreciated that either or both the inverter stage and the rectifier stage may be operated in multiple modes to achieve a desired overall operating mode of the power converter.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to, and should not be construed as, limiting the scope of the concepts, systems, circuits and techniques described here. Like numbers in the figures denote like elements.

DETAILED DESCRIPTION

Before describing VFX power converter concepts, systems and techniques, some introductory concepts and terminology are explained. Described herein in relation to the figures are concepts, systems and techniques for providing a variable frequency multiplier ("VFX") power converter (also sometimes referred to herein as a "power converter" or more simply a "converter") having an efficiency which is relatively high compared with the efficiency of prior art power converters. As used herein the term "electrical grid" (or more simply, "grid") refers to an interconnected network for delivering electricity from suppliers to consumers and should not be taken to imply any particular physical layout or breadth. Thus, as used herein, the term "grid" may refer to an entire continent's electrical network, a regional transmission network or may be used to describe a subnetwork such as a local utility's transmission grid or distribution grid.

Figure 1:
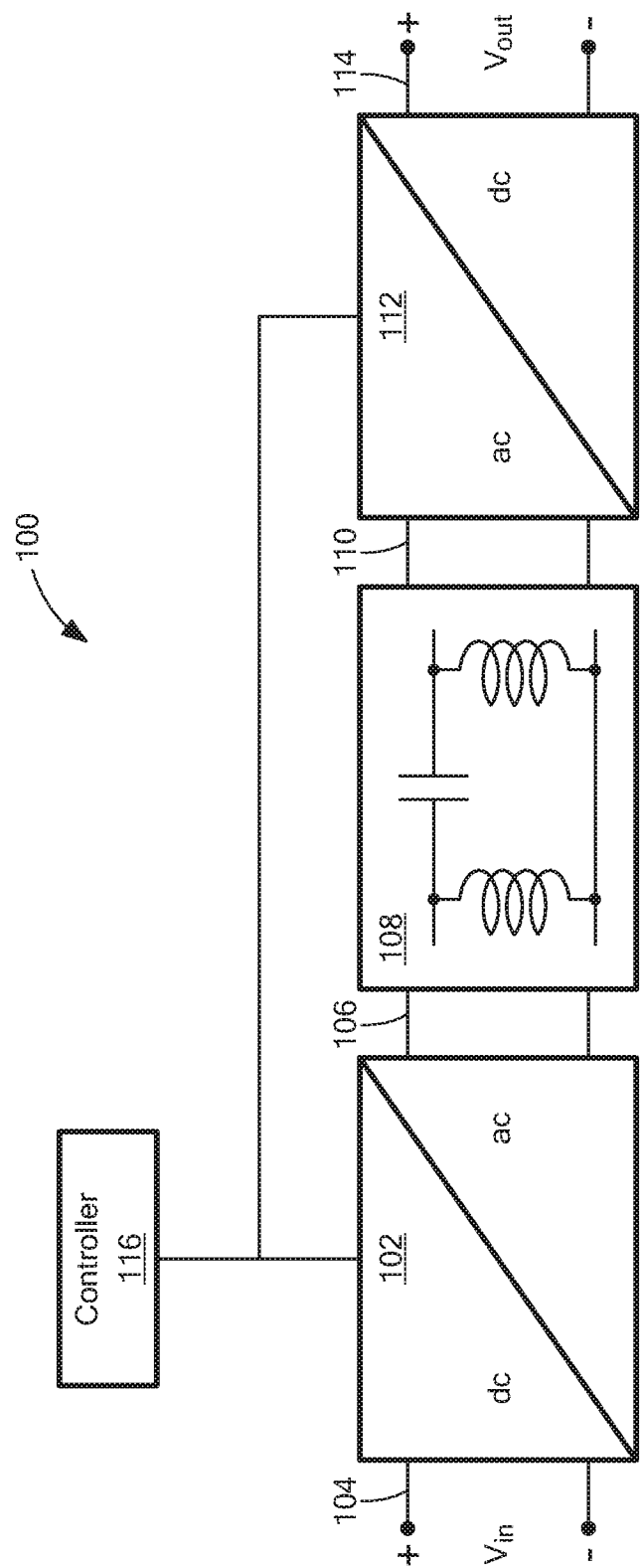
FIG. 1 is a block diagram of a variable frequency multiplier ("VFX") power converter.

Referring now to FIG. 1, a variable frequency multiplier ("VFX") power converter 100 is here shown to include three stages with a first stage corresponding to an inverter stage 102, a second stage corresponding to a transformation stage 108 and a third stage corresponding to a rectifier stage 112.

In one embodiment, inverter stage 102 receives a DC input signal 104 at an input thereof and provides an intermediate AC output signal 106 at an output thereof. Transformation stage 108 receives AC output signal 106 at an input thereof and transforms or operates on AC output signal 106 in one or more ways including, but not limited to: providing voltage transformation, electrical isolation, and waveform shaping, etc. to provide an AC output signal 110 at an output thereof. Rectifier stage 112, receives AC output signal 110 at an input thereof and converts AC output signal 110 into a DC output signal 114 appropriate for use in a variety of manners including, but not limited to providing power to electronic devices such as severs within a data center or to other DC loads.

Coupled to inverter stage 102 and/or to rectifier stage 112 is a controller circuit 116. Controller circuit 116 is configured to control the switching operation of inverter stage 102 and/or rectifier stage 112. As will be discussed below, inverter stage 102 includes one or more switches cooperatively operable to convert DC input signal 104 into an AC output signal 106. Similarly, rectifier stage 112 includes one or more switches cooperatively operable to convert AC signal 110 back into a DC output signal 114. Controller circuit 116 is coupled to control the operation and timing of these switches.

Controller circuit 116 is capable of controlling inverter stage 102 and/or rectifier stage 112 at various frequencies, depending upon the power or voltage of input signal 104 and the desired output power or voltage of output signal 114. Although a DC/DC converter is shown, the converter 100 can also function as an AC/DC, DC/AC or AC/AC converter, by the addition of a rectification and/or inversion stage at the input and/or the output port.

Converter 100 is also capable of operating over a wide operating range in voltage (e.g., large conversion ratios such as large step-down transformation, and large variations in required conversion ratio) and wide operating range in power. In particular, by changing the operating frequency, duty cycle, and/or other timing of inverter 102 and/or rectifier 112, controller 116 can change the operating mode of converter 100 to increase the efficiency of converter 100 when converter 100 is operating with different input voltages or power, output voltages or power, etc. In effect, converter 100 can change operating mode to "shift gears" of the controller 100 to compensate for different input and output voltages to increase the range for which high-efficiency operation of converter 100 can be maintained.

In one exemplary embodiment, controller 116 can change the operating mode of converter 100 without altering the dominant frequency at which power is transferred through the transformation stage 108. In other words, controller 116 may operate inverter 104 at a harmonic frequency that is an integer multiple of a fundamental frequency of the inverter stage 104 and/or operate the transformation stage 108 at a frequency that is a harmonic frequency that is an integer multiple of a fundamental frequency of the transformation state 108 or the rectifier stage 112. By changing the frequency of operation of rectifier stage 112, converter 100 can also provide a natural step-down voltage conversion through rectifier stage 112 in applications where this is desirable, which may reduce the burden and power loss associated with the transformation stage 108.

Figure 2:
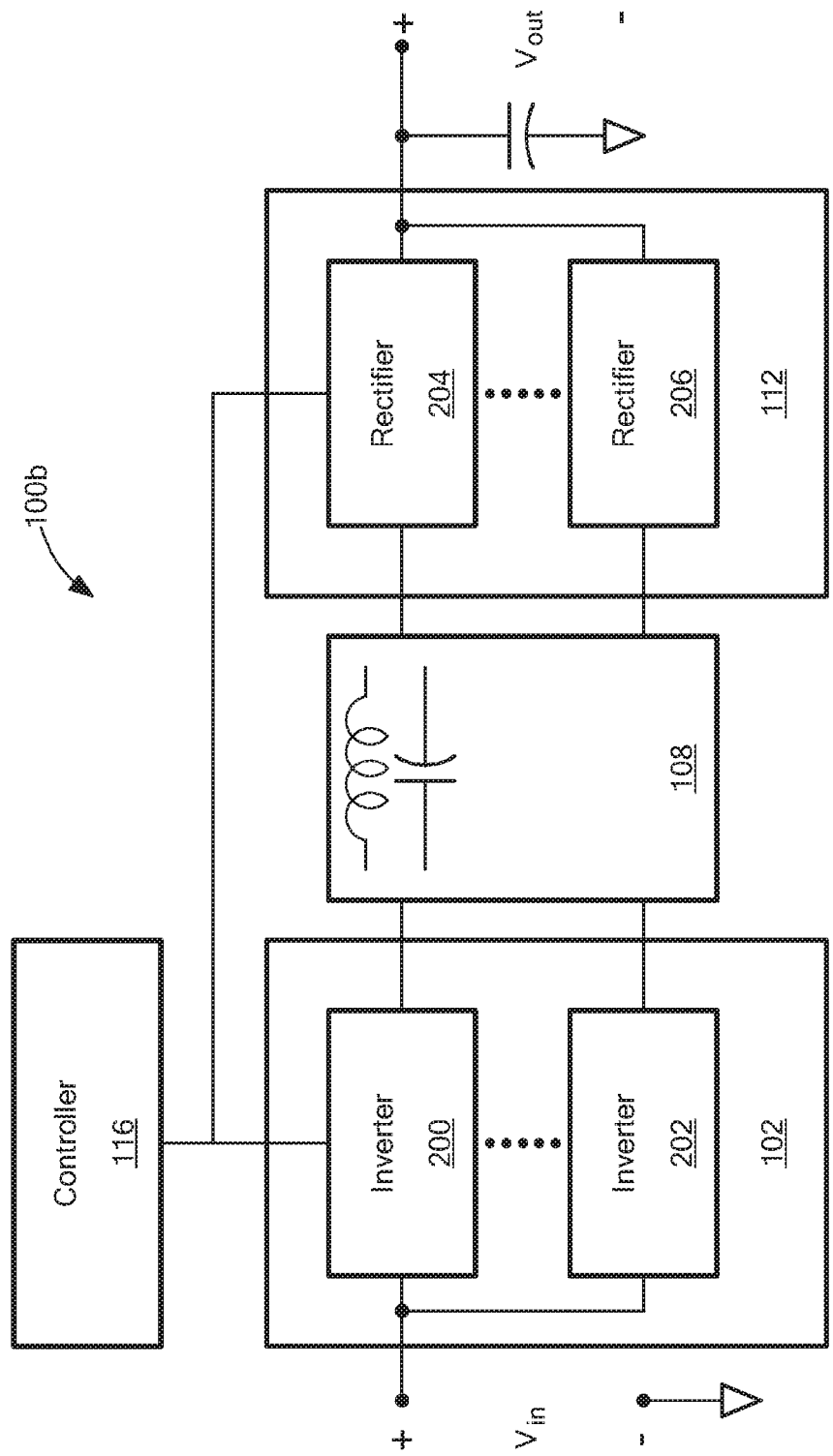
FIG. 2 is block diagram of a VFX power converter having multiple inverter and rectifier circuits.

Referring now to FIG. 2, a converter 100b, which may be the same as or similar to converter 100 described above, includes inverter stage 102 comprising multiple inverter circuits (two exemplary inverter circuits 200 and 202 being shown in the exemplary embodiment of FIG. 2). Although two inverter circuits are shown, inverter stage 102 can include one, two, or more inverter circuits as required by design or to meet desired performance characteristics. One of ordinary skill it the art will, after reading the description provided herein, understand how to select the number of inverters to include in inverter stage 102. Similarly, rectifier stage 112 contains multiple rectifier circuits 204 and 206. Although two rectifier circuits are shown, rectifier stage 112 can include one, two, or more rectifier circuits as desired. Again, one of ordinary skill it the art will, after reading the description provided herein, understand how to select the number of rectifiers to include in rectifier stage 112.

Inverter circuits 200 and 202 and rectifier circuits 204 and 206 include internal switching elements (or more simply "switches") having control terminals, as will be discussed below. In some exemplary embodiments, these switches are implemented by one or more field effect transistors (FETs). Controller 116 may be coupled to the switching element control terminals (e.g. gates of the FETs) in order to control operation of the switches. In embodiments, controller 116 can control the switching operation of inverter 200 independently of the switching operation of inverter 202, and control the switching operation of rectifier 204 independently of the switching operation of rectifier 206. For example, controller 116 can operate inverter 200 at one frequency or duty cycle, and simultaneously operate inverter 202 at another frequency and/or duty cycle. Of course, controller 116 can operate inverters 200 and 202 at the same frequency and duty cycle, if desired. The same concept applies to rectifier 204 and 206—controller 116 can operate rectifier 204 and 206 independently of one another.

Transformation stage 108 includes a so-called Impedance Control Network ("ICN"). However, other types of transformation stages can also be used including resonant conversion networks and/or the inductive transformer network such as used in a dual-active bridge system. Transformation stage 108 operates to shape the operating waveforms to maintain simultaneous zero voltage switching (ZVS) and near zero current switching (ZCS) of the transistors across operating range, to reduce (and ideally minimize) stress and switching loss, and enabling converter 100b to be implemented having both a high efficiency and power density. While the exemplary converter 100b is shown as incorporating an impedance control network, it will also be appreciated that the variable frequency multiplying controller 116, inverter stage 102, and/or rectifier stage 112 can be included in other converter systems, including series-resonant converters, parallel-resonant converters, series/parallel resonant converters, LLC converters and other resonant and non-resonant power converters, including dual-active bridge converters and related variants (such as using more complicated inverter or rectifier structures), double-ended forward converters, etc.

Although inverter circuits 200 and 202 are shown coupled in a parallel configuration in the exemplary embodiment of FIG. 2, it should be appreciated that the inverter circuits within inverter stage 102 can be coupled in series, in parallel, or with a combination of series and parallel connections. Similarly, the rectifier circuits within rectifier stage 112 can also be coupled in series, in parallel, or with a combination of series and parallel connections.

As noted above, converters 100 and 100b employ frequency multiplier operating modes of the inverter stage and/or rectifier stage to maintain high-efficiency performance across a wide operating range of input power or voltage, and output power or voltage.

In one exemplary embodiment, converters 100 and 100b employ an additional operating mode of the inverter and/or rectifier to increase operating range, such as for reduced output voltage and/or output power conditions or for high input-voltage conditions. In this context, frequency multiplication can be used to extend the efficient operating range of a converter and improve its performance (e.g., for low powers and low output voltages).

Figure 3:
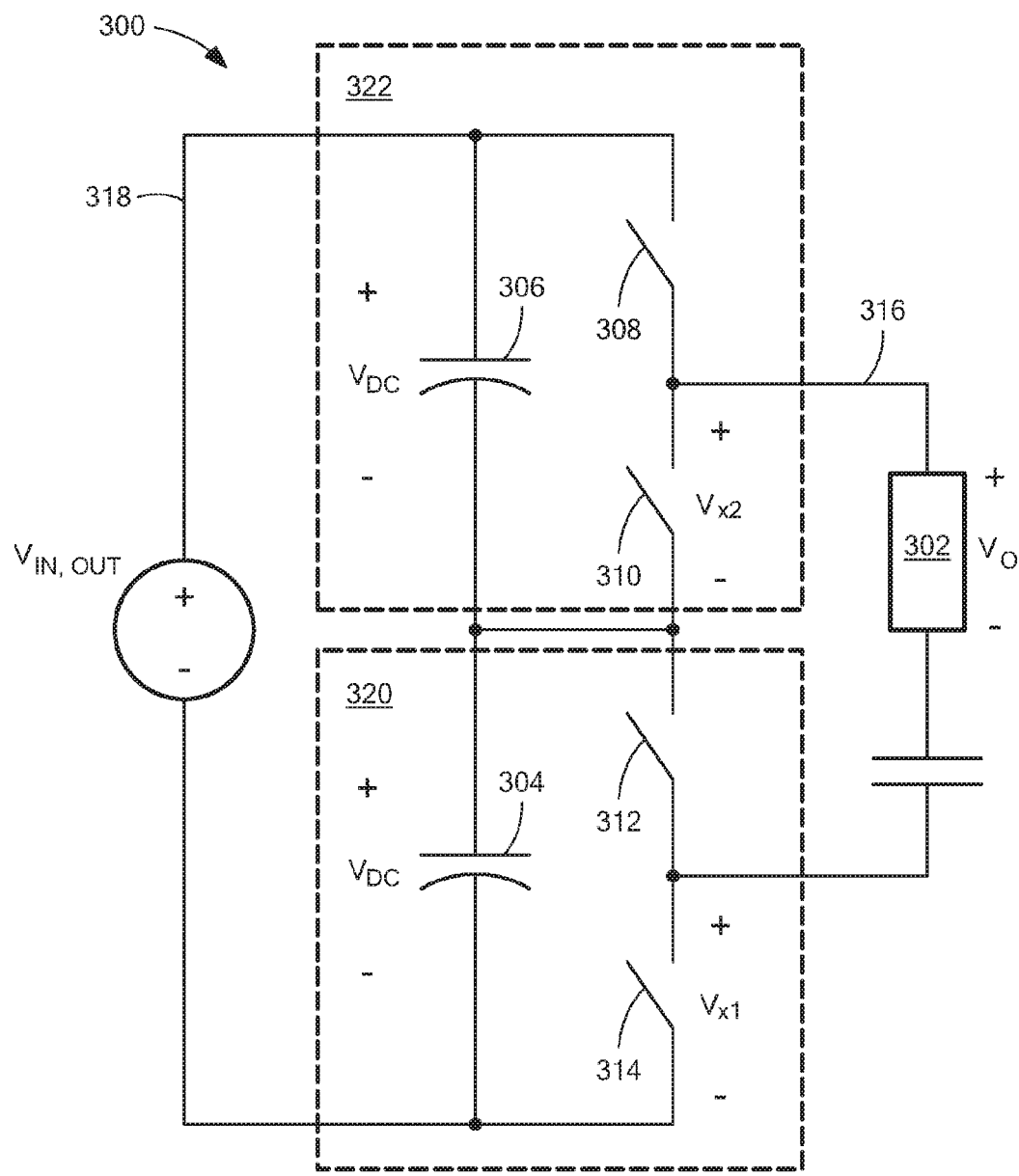
FIG. 3 is a schematic diagram of an inverter which may be used as a stage of a power converter which may be the same as or similar to the power converters of FIG. 1 or 2.

To illustrate this concept, FIG. 3 shows an exemplary inverter circuit 300, which may be the same as or similar to inverter circuits 200 and 202. Inverter circuit 300 may be referred to as a stacked-bridge inverter because the input voltage $V_{IN,TOT}$ is split in two nominally equal values of $V_{DC}$ (where $V_{DC}$ is nominally equal to about $0.5*V_{IN,TOT}$) across stacked capacitors 302 and 304. The voltage across the capacitors 304 and 306 can be maintained passively or through active control by controller 116, which may control the operation of the switches 308-314. The energy storage and switching element components shown in FIG. 3 (which may be semiconductor devices) are ideally rated for one-half of the total bus voltage. The inverter output voltage $V_o$, shown across an element 302 which represents the input to the bad network (e.g. the input to transformation stage 108). A conventional full-bridge inverter structure comprising two half bridges (with paralleled input ports) could also be employed. Note that driven backwards (i.e. providing input power at terminal 316 and producing an output power signal at terminal 318, with the right timing with respect to the AC current) this structure could also act as a stacked-bridge rectifier.

In operation, the input voltage $V_{in}$ is split in two, with each half bridge ideally provided having a voltage level $V_{DC}$ corresponding to $0.5 \cdot V_{IN,TOT}$ (i.e. $V_{DC}=0.5 \cdot V_{IN,TOT}$). It should be noted that a conventional full bridge inverter comprising two half-bridges with paralleled inputs could also be used.) By controlling the fundamental switching period of the constituent half-bridge inverters, in addition to the duty ratios $D_1$ and $D_2$ of the bottom half 320 and top half 322 bridge inverters, and the time delay $\Delta t$ between them, the inverter circuit 300 can produce output waveforms $v_o(t)$ that have desirable characteristics at a frequency $f_0$ (operating period $T_0=1/f_0$) needed to drive the load network (not shown). The inverter system can be controlled to synthesize an output frequency $f_0$ that is a multiple (i.e. a harmonic) of the fundamental inverter switching frequency $f_A=1/T_A$ (i.e., such that the stacked-bridge inverter is operated as a frequency multiplier). Moreover, through proper selection of operating points, one can vary the multiplier ratio, providing so-called "gear shifts" in operation, while preserving soft switching and other desired operating characteristics.

Figure 4:
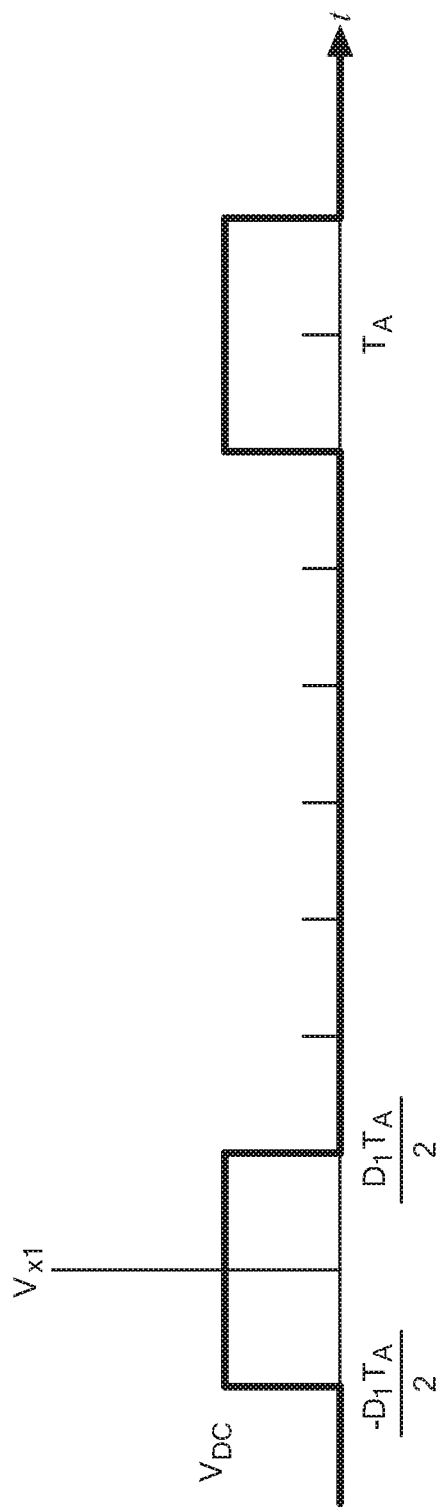
FIG. 4 is plot of amplitude vs. time for a series of switching signals which operate switches of an inverter which may be the same as or similar to the inverter of FIG. 3.

Referring now to FIG. 4, is a graph illustrating the Fourier analysis of one of the half-brides 320 or 322 of the inverter circuit 300 of FIG. 3. The graph illustrates the output of one of the half bridges operating with one pulse per operating period TA with duty ratio D. The waveform is shown as even in time with no time delay. An additional delay $\Delta t$ may be added.

If one of the constituent half-bridges is operated with duty ratio $D_1$ and period $T_A$ with an even operating waveform, as illustrated in FIG. 4, the half-bridge output voltage waveform can be expressed as the following Fourier series:

$$v_{x1}(t) = D_1 V_{dc} + \sum_{n}^{\infty} \frac{2V_{dc}}{\pi n} \sin(n\pi D_1)\cos\left(\frac{2\pi n t}{T_A}\right)$$

Figure 5:
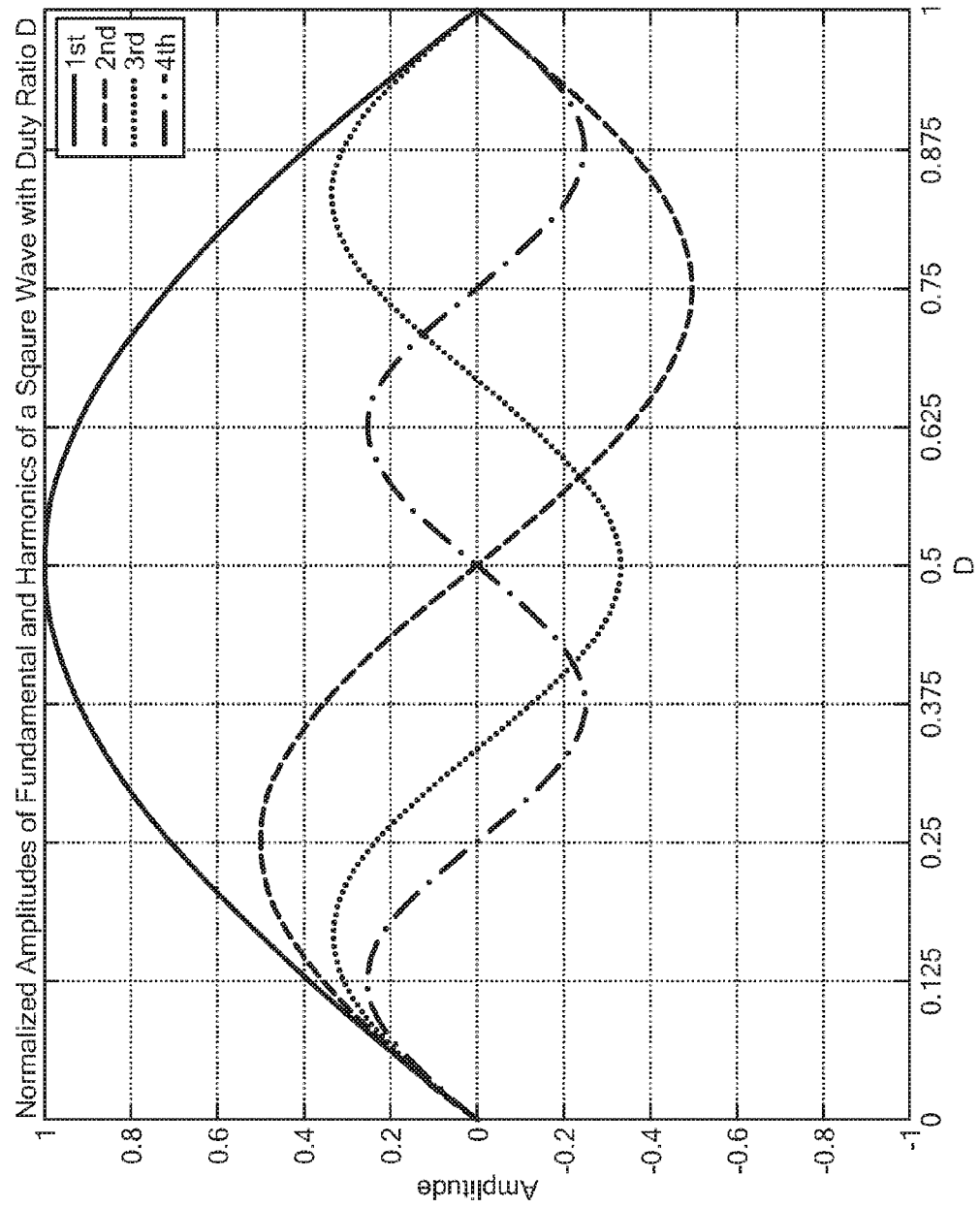
FIG. 5 is a plot of output signal amplitude of an inverter vs. switching duty cycle of the inverter.

Referring now to FIG. 5, an amplitude of the fundamental of this waveform and its harmonics as a function of duty ratio (normalized to the maximum of $2 \cdot V_{dc}/\pi$) is shown. Duty ratios, delays and switching periods of the half-bridge inverters can be selected to develop different operating modes.

Figure 6A:
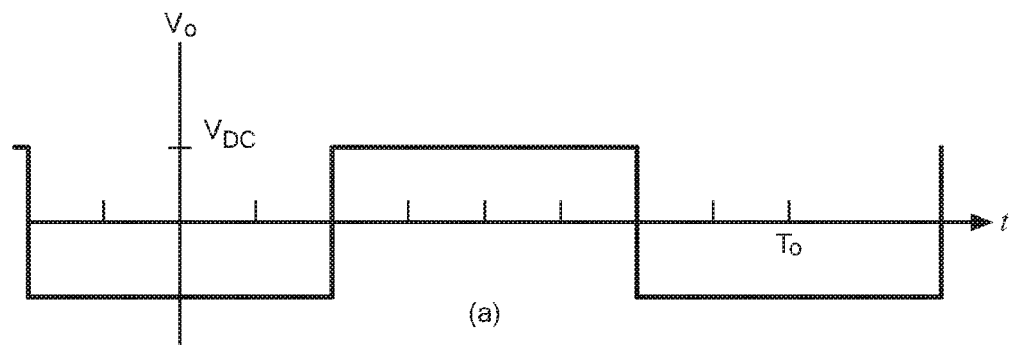
FIGS. 6A and 6B are graphs of the output of an inverter.
Figure 6B:
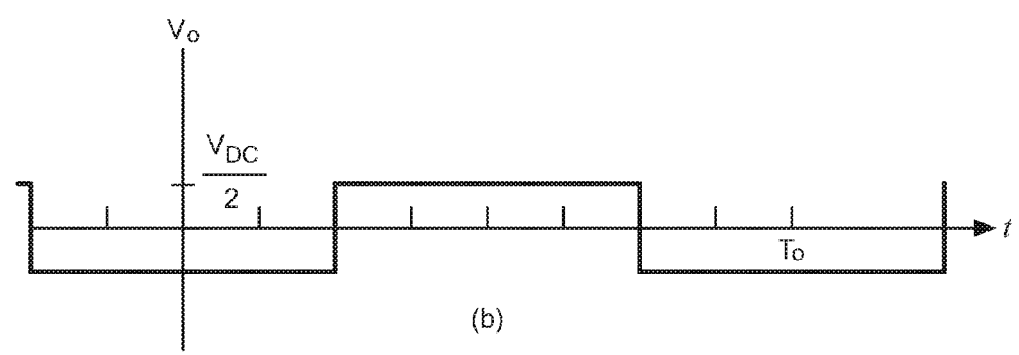

Operating the inverters at the desired output frequency (e.g. $T_A=T_0$), with a delay of half a cycle $\Delta t=0.5 \cdot T_A$ between the half bridges and with identical duty ratios $D_1=D_2=0.5$ results in an output waveform as shown in FIG. 6A. This is the normal inverter operation one would utilize, which is referred to in this application as a "fundamental mode" of operation. However, if the half-bridge inverters are operated at a fundamental frequency that is half that of the desired output (e.g. $T_A=2 \cdot T_0$; D1=0.25; D2=0.75; and $\Delta t=0$) a "frequency doubler" mode of operation is achieved that yields output waveform $v_o$ of FIG. 6B. This operating point cancels the fundamental of the half-bridge waveforms and reinforces their second harmonic (see FIG. 5). Consequently, the output waveform of FIG. 6B may have the same frequency $f_0$ as the output waveform of FIG. 6A, but half the output amplitude, and with the individual transistors switching at half the rate (reducing gating and switching loss). The current from the loading network (e.g., with inductive loading at $f_0$) provides soft switching opportunities for the individual transistors at each transition, just as in fundamental mode. Operated in this manner, the inverter acts as a frequency multiplier with varying multiplier ratios (1 and 2 in this case). The flexibility provided by this variable frequency multiplier (VFX) operation is valuable for efficiently spanning wide ranges in power and voltage, while preserving other system operating characteristics.

Figure 7:
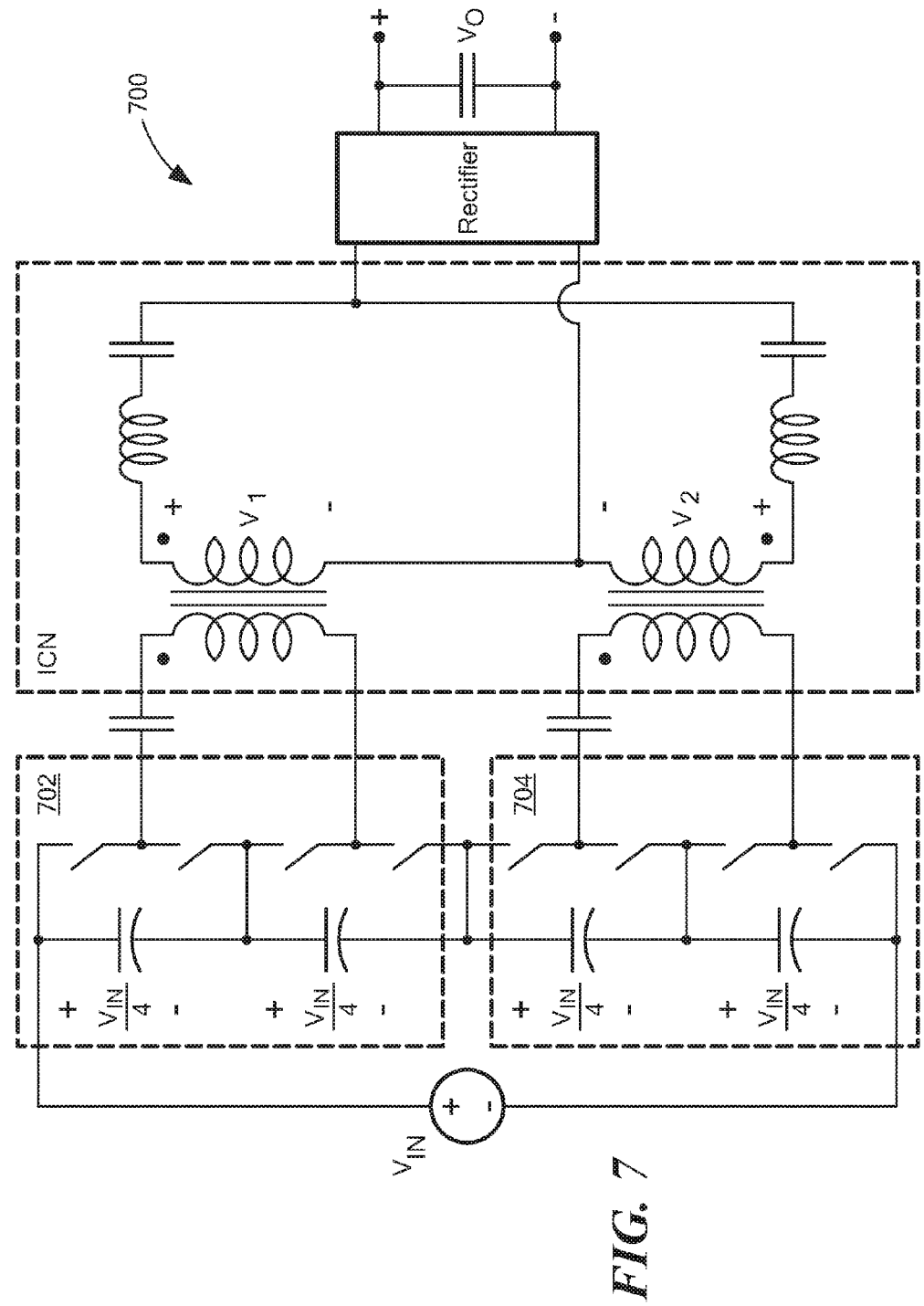
FIG. 7 is a schematic diagram of a power converter having a stacked inverter.

Referring now to FIG. 7, a resonant converter circuit 700, which may be the same as or similar to the converter circuits described above, includes a pair of stacked bridges 702 and 704 that are also stacked. This has the benefit of utilizing low-voltage devices for a high-voltage input. Among many options, this circuit can be operated in fundamental mode, as well as multiplier modes (including frequency doubler and quadrupler modes) for extending the efficient operating range.

Figure 8A:
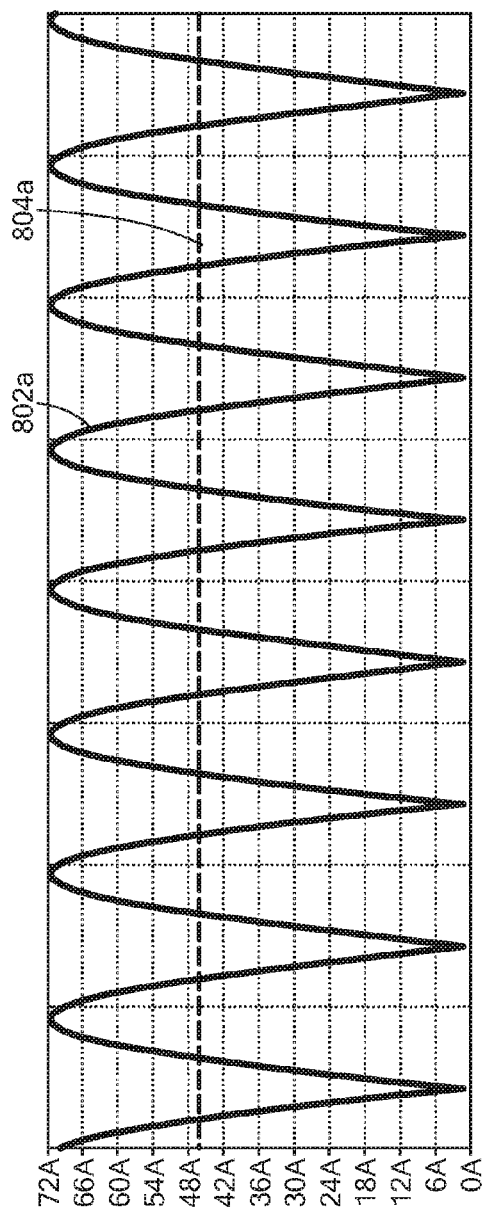
FIGS. 8A and 8B are graphs of input and output signals of an inverter.
Figure 8A:
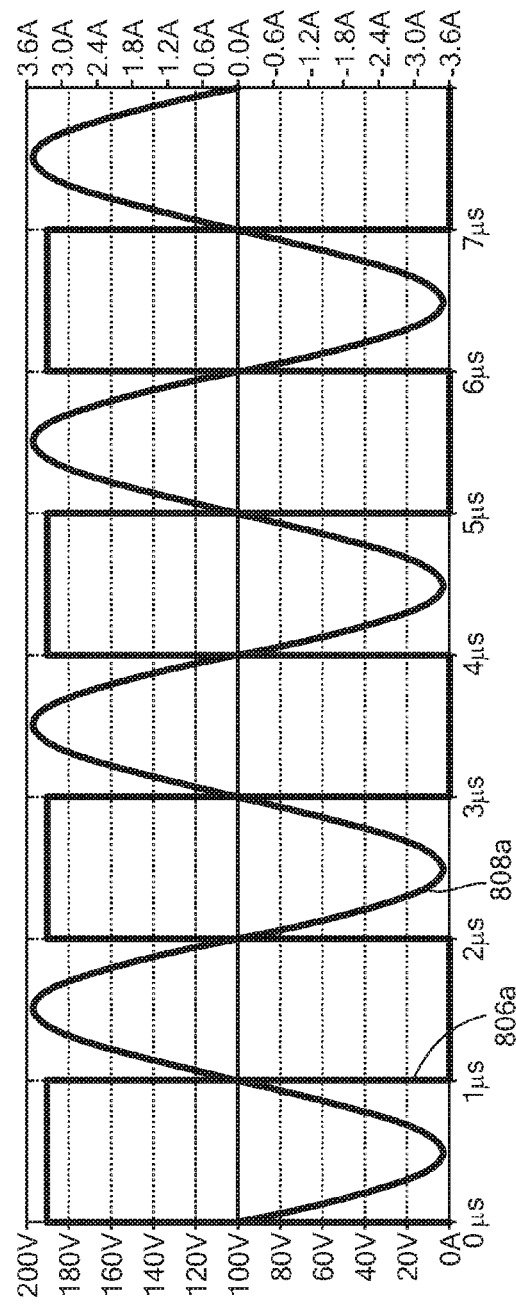
Figure 8B:
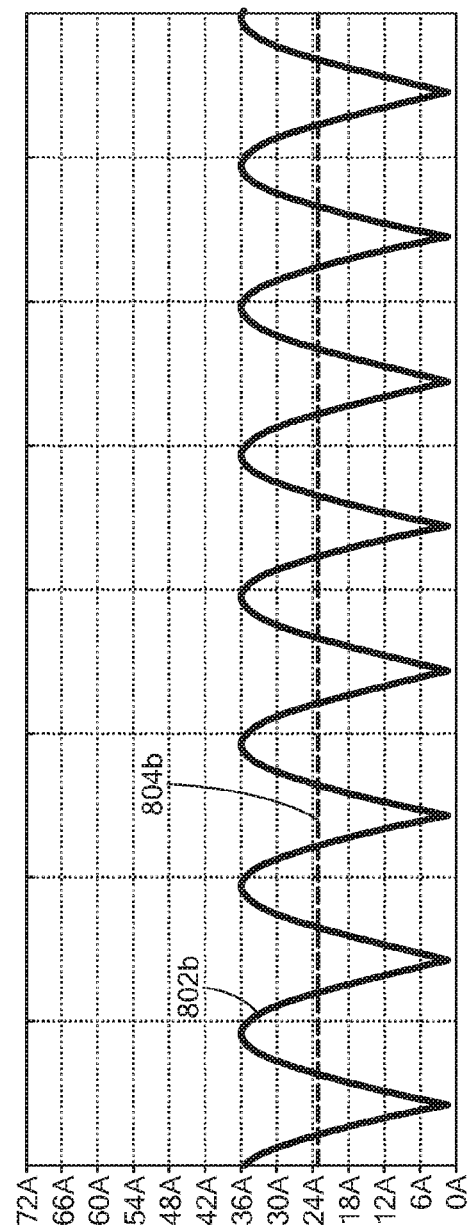
Figure 8B:
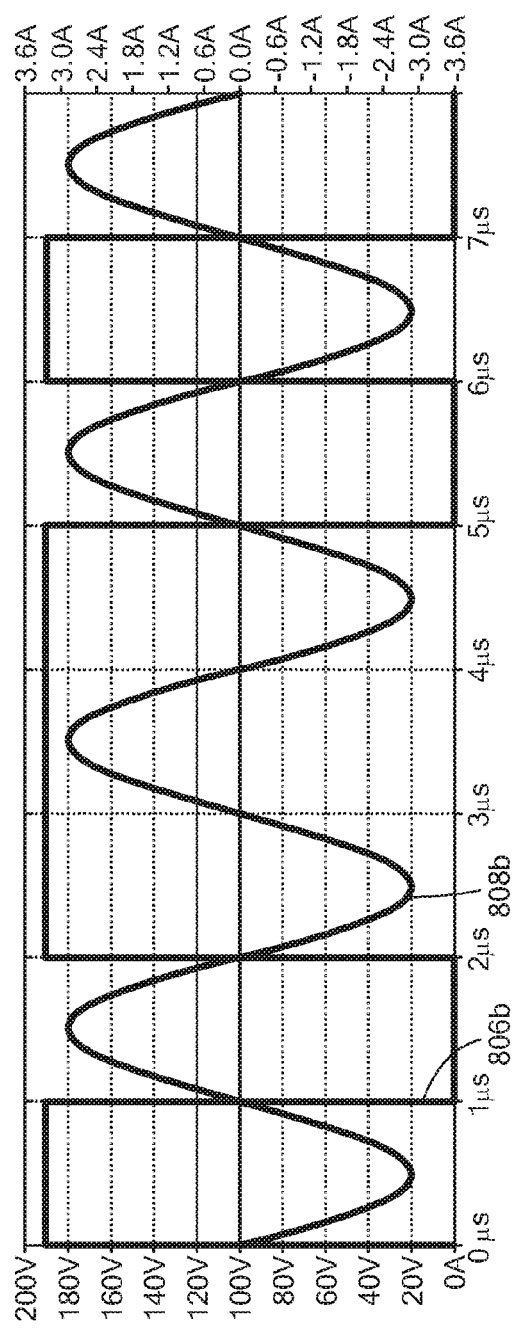

Referring now to FIG. 8A and FIG. 8B, waveforms representing the operation of converter 700 are shown. Waveforms 802a and 802b represents rectified output current of the converter. The dotted lines 804a and 804b represents the average output current of the converter. Waveforms 806a and 806b show voltage across one inverter switch and sinusoidal waveforms 808a and 808b show current through the associated branch of the combiner network. FIGS. 8A and 8B illustrate two operating modes of the converter 700. In FIG. 8A, all four half-bridge inverters switching are switching at 50% duty ratio at 500 kHz, and in FIG. 8B, two inverters are switching at 25% duty ratio and the other two at 75% duty ratio at 250 kHz. The second mode provides an automatic step down in voltage helping maintain high efficiency at low output power, as can be seen, for example, by the reduced height of waveforms 802b and 804b in comparison to waveforms 802a and 804a.

The examples above are extensible when applied in an impedance control network ("ICN") converter system. The ICN can be used to reduce switch count and/or achieve additional multiplier modes of operation.

Figure 9:
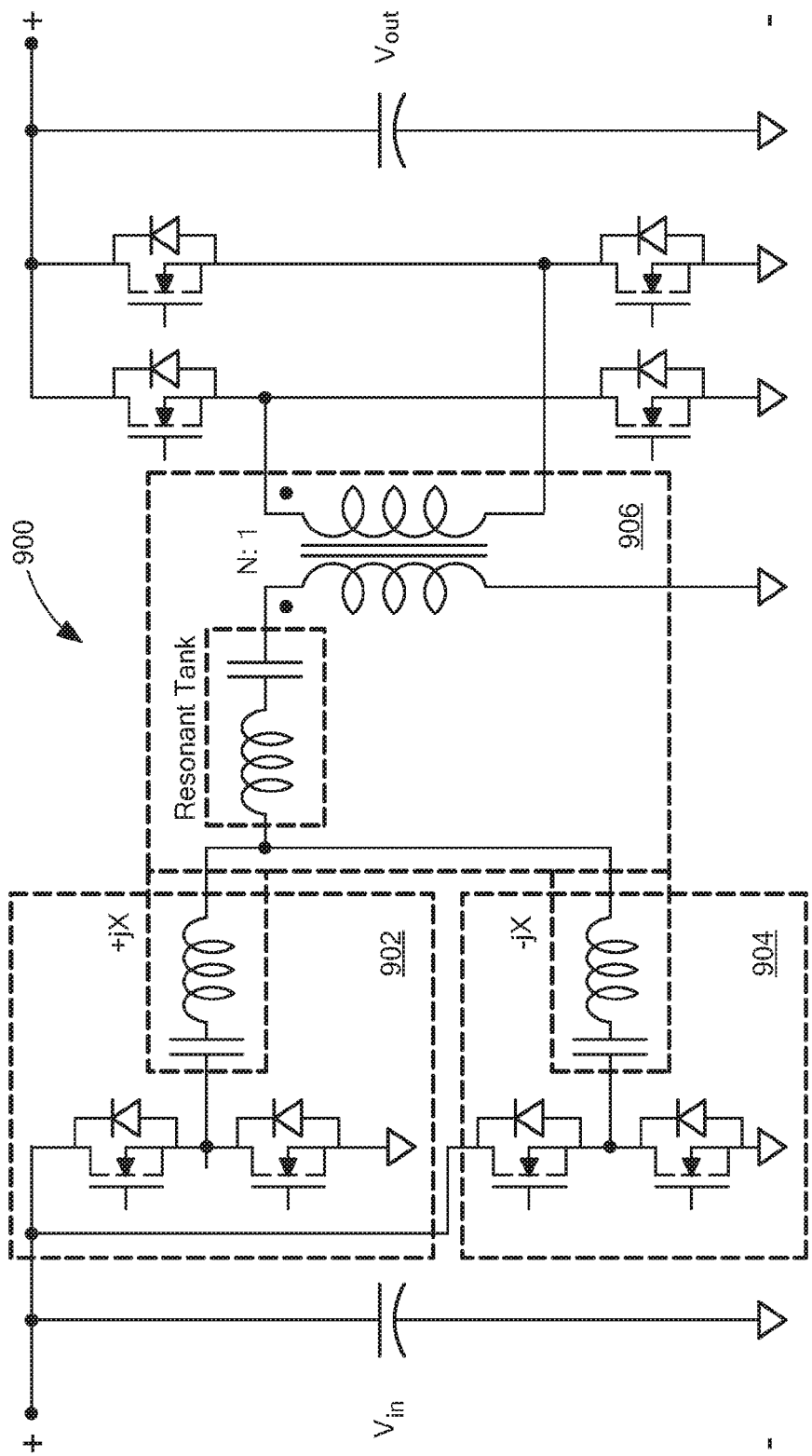
FIG. 9 is a schematic diagram of a power converter circuit having a resonant tank circuit.

Referring to FIG. 9, for example, an ICN converter 900 (which may be the same as or similar to converter circuits described above) includes inverters 902 and 904. Inverters 902 and 904 may be operated in a VFX configuration by a controller, such as controller 116 in FIG. 1. In other words, inverters 902 and 904 may be operated at a fundamental frequency and duty cycle ratio (i.e., in fundamental mode), or at a frequency and duty cycle that are multiples of the fundamental frequency and duty cycle. Inverters 902 and 904 may be operated at the same frequency by controller 116, or may be operated at different frequencies.

In fundamental mode, the half-bridge inverters 902 and 904 operate at the desired output frequency $f_o$ under phase-shift control at D=0.5, as previously described. In multiplier mode, controller 116 operates the half-bridge inverters at half that of the desired output frequency (with $D_1$=0.25 and $D_2$=0.75, which maximizes the second harmonic component). In this case, partial cancellation of the fundamental output components of the half-bridge inverters is achieved (due to the ICN control requirements). This is augmented by the filtering properties of the ICN network 906 to attenuate the undesired fundamental component. In operation, the frequency component of the output at $f_o/2$ has negligible impact over the operating range of the system in multiplier mode. Thus, by changing the frequency and/or duty cycle of the inverters, the circuit can operate at lower output power, switching loss, and conduction loss over a wide range of inputs voltages and powers and output voltages and powers.

It is also possible to realize further multiplier operating modes. For example, in addition to fundamental and doubler mode, the converter 700 shown in FIG. 7, for example, can be operated by controller 116 in a frequency quadrupler mode (with each half-bridge operated at one-fourth of the fundamental frequency), using a combination of direct cancel/abort and filtering to mitigate components below $f_o$. Alternatively, the top bridge 702 and the bottom bridge 704 can be phase shifted with respect to each other, to provide the equivalent waveforms of a phase-shifted bridge but with the added ability to switch modes between fundamental and doubler mode for each stacked bridge.

Figure 10:
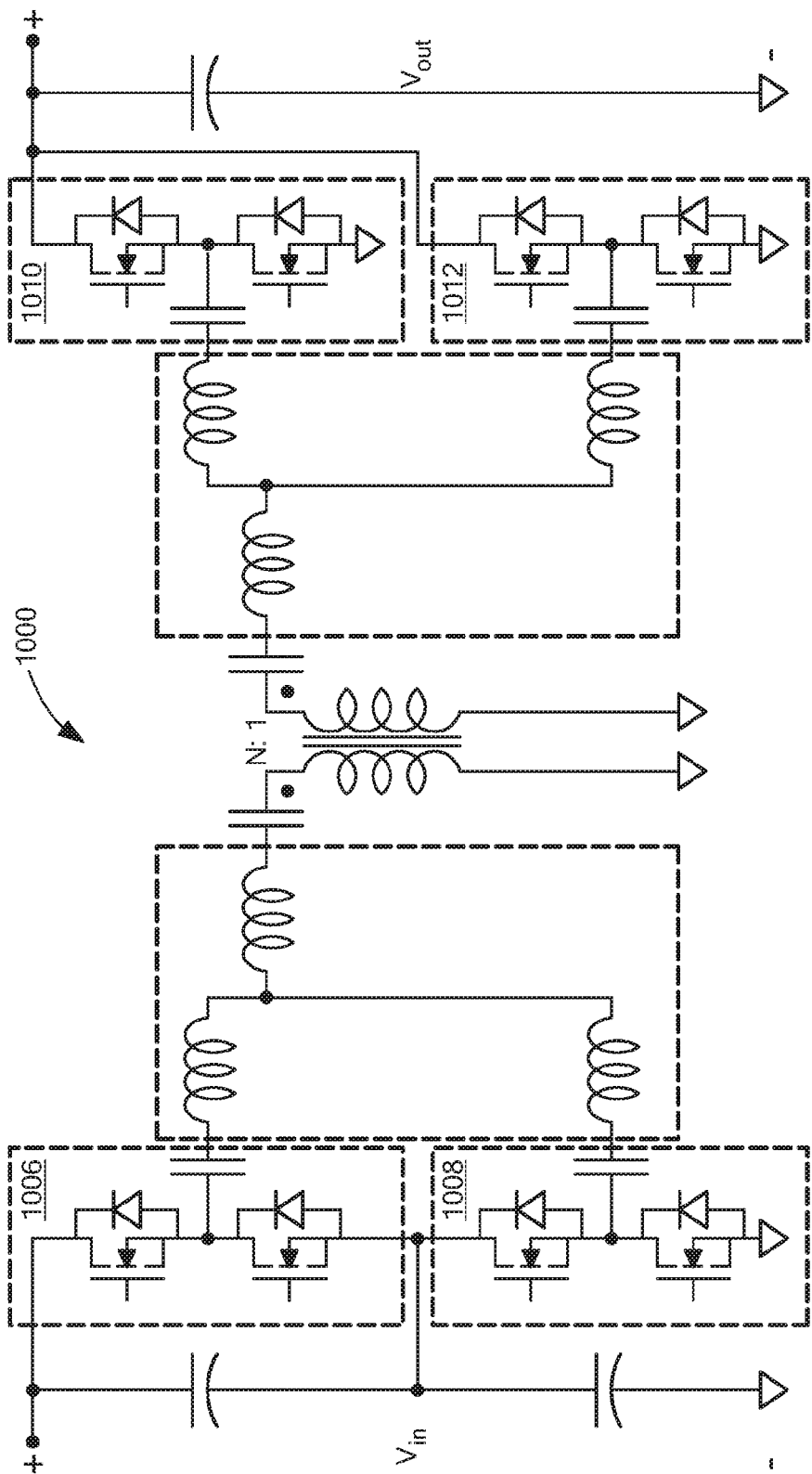
FIG. 10 is a schematic diagram of a power converter circuit having a pair of resonant tank circuits.

It is also possible to control the output power of the converter by controlling the phase shift between the inverters, instead of or in addition to controlling the frequency and duty cycle and/or bursting the converter on and off. In this case, the lossless combiner (e.g. transformation stage 108 in FIG. 1) can be augmented with a resistance compression network to form an impedance control network that still maintains near-resistive loading of the inverters, as shown in FIG. 9. With this combiner-RCN impedance control network the susceptance seen by the two inverters can be made constant as a function of output power, negative (i.e., inductive) and arbitrarily small for the nominal input and output voltages, as shown in FIG. 10. As the input and output voltages vary from their nominal values, the susceptance varies slightly, but much less than the variation without the combiner-RCN impedance control network. Hence, the admittances seen by the inverters can be made purely conductive across the full output power range at the nominal input and output voltage, and mainly conductive over a reasonably wide variation in input and output voltage.

The availability of additional operating modes with a VFX inverter stage enables efficient operation over wide input and output power ranges. Furthermore, because lower synthesized drive voltages can be used in multiplier mode, this technique can be applied to efficiently operate across increased input voltage ranges or output voltage ranges.

Referring to FIG. 10, it will also be recognized that, while the inverters described above are shown here as converting DC to AC, the inverter structure can also be used to convert AC to DC forming a VFX rectifier) if driven backwards. The changes in operating mode resulting from variable frequency multiplying of the inverter can thus be applied to the rectifier portion of a DC-DC converter. VFX inverter structures and rectifier structures can be paired together (e.g., in a dual-active bridge or stacked-bridge or double-stacked bridge configuration or in an ICN conversion system such as in FIG. 10) to get still wider operating ranges. This may be accomplished by operating the inverter portion and rectifier pardons in different operating modes.

For example, the converter circuit 1000 in FIG. 10 includes an inverter stage and a rectifier stage. The inverter stage includes a stacked inverter structure comprising an inverter 1006 and an inverter 1008. The rectifier stage includes an inverter 1010 and an inverter 1012. In an embodiment, a controller (e.g. controller 116 in FIG. 1) can operate inverters 1006 and 1008 of the inverter stage at the fundamental frequency and duty cycle or at a multiple of the fundamental frequency and duty cycle, as described above. The controller can also operate inverters 1006 and 1008 in the same mode or in different modes from each other, as described above.

Similarly, the controller can operate inverter 1010 and inverter 1012 of the rectifier stage at the fundamental frequency and duty cycle or at a multiple of the fundamental frequency and duty cycle, as described above. The controller can also operate inverters 1006 and 1008 in the some mode or in different modes from each other, as described above.

Figure 11:
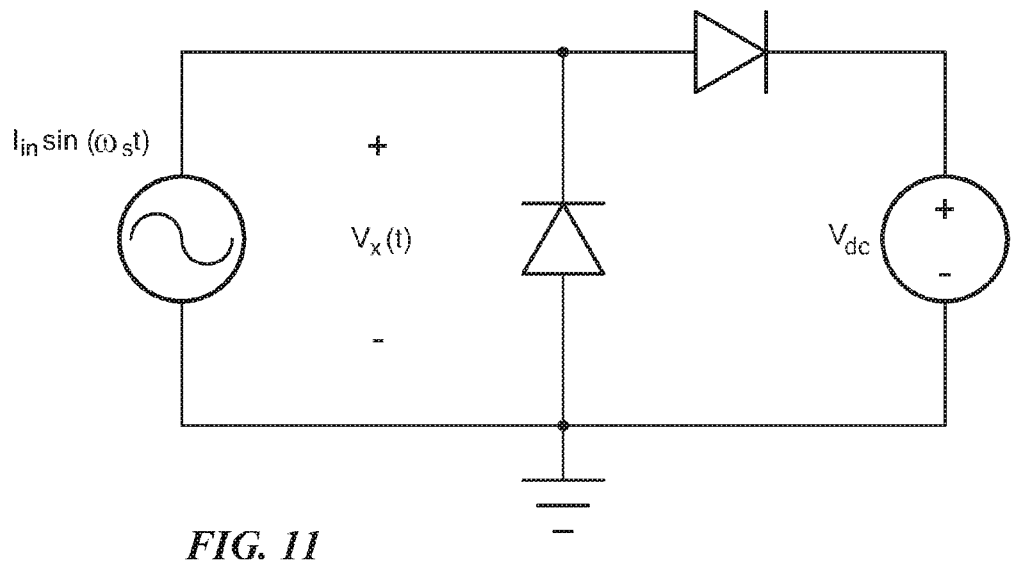
FIG. 11 is a schematic diagram of a half-wave rectifier circuit.
Figure 11A:
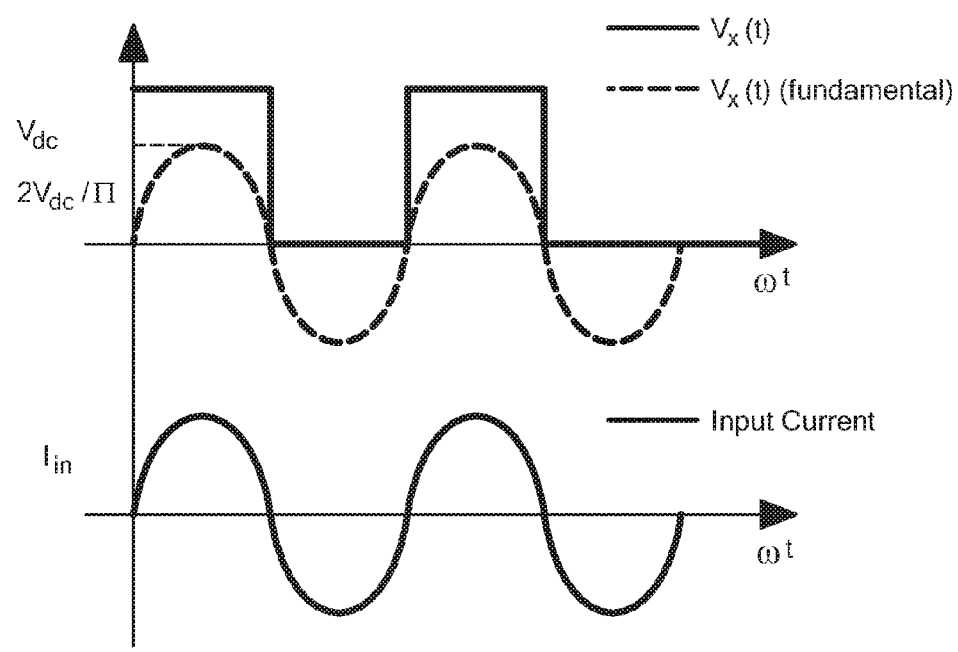
FIG. 11A is a series of waveforms associated with the half-wave rectifier of FIG. 11.

In an embodiment, the rectifier stage may be implemented as a half bridge rectifier, such as that shown in FIG. 11, that provide additional voltage step down to reduce the burden on the transformation stage with an associated waveform in FIG. 11A.

Figure 12A:
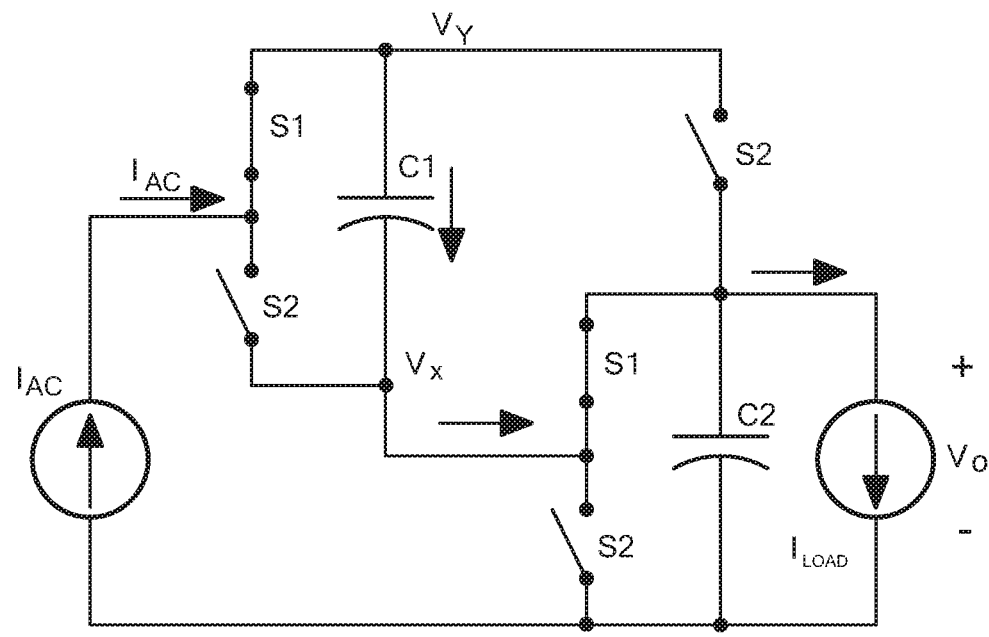
FIGS. 12A and 12B are a series of schematic diagrams of a rectifier circuit.
Figure 12B:
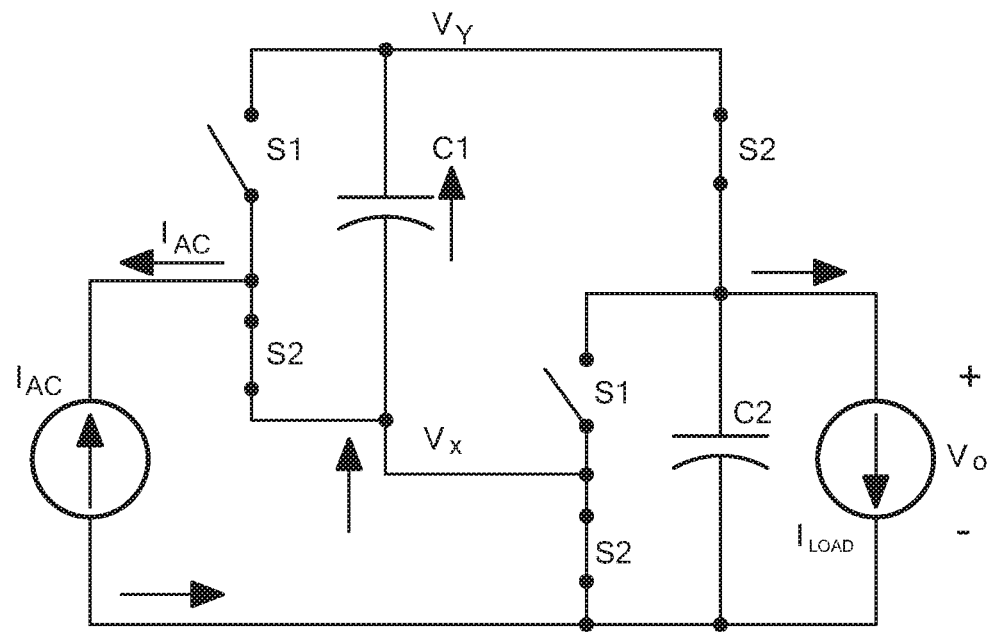
Figure 12C:
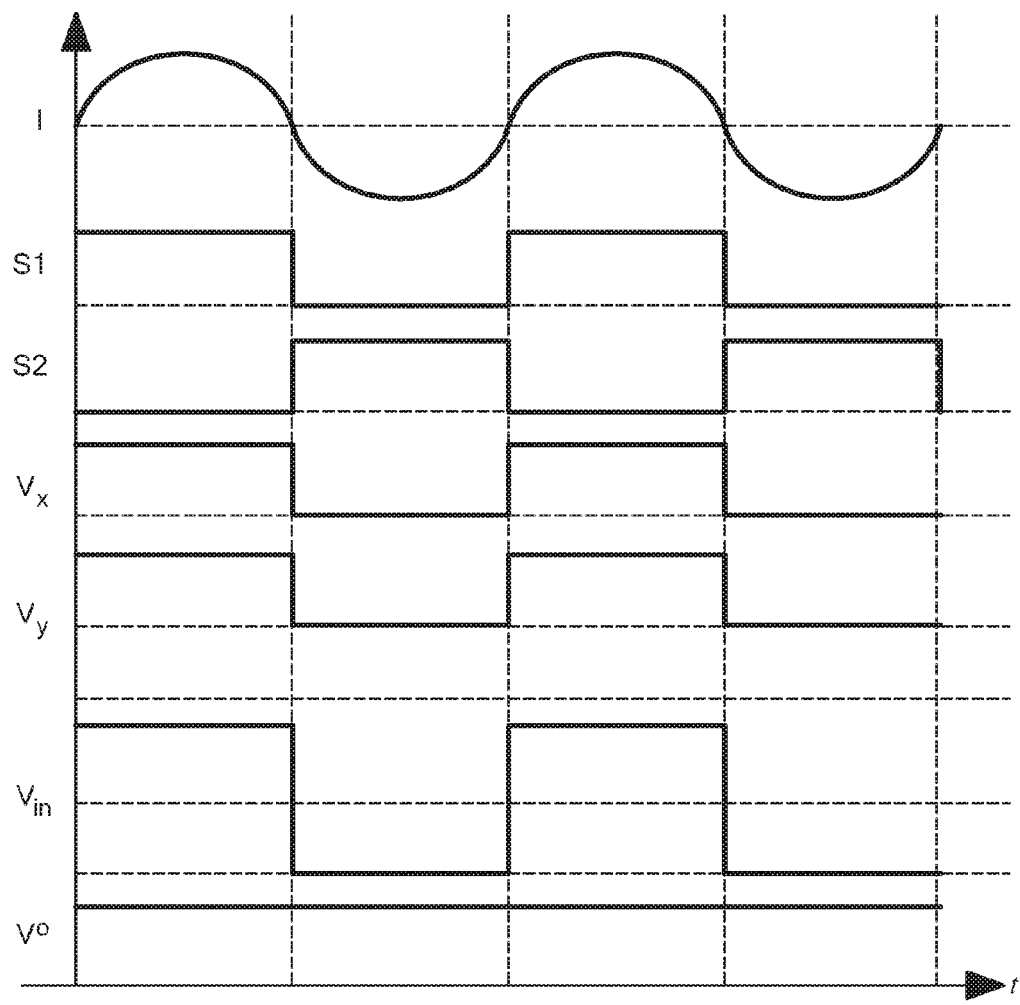
FIG. 12C is a plot of waveforms associated with the rectifier circuit of FIGS. 12A and 12B.

FIGS. 12 and 12A show an example of a switched capacitor rectifier that can provide an additional factor-of-two step-down as compared to an equivalent half-bridge rectifier of FIG. 11. This is achieved with low-voltage devices (i.e., rated only for the output voltage) and gate drive circuitry. A waveform patter associated with FIGS. 12 and 12 are illustrated in FIG. 12B.

In some exemplary embodiments, the mode of operation of the inverter structure and rectifier structure can provide a natural voltage or power step-down. As noted above with regard to FIGS. 8A and 8B, operating one or more of the inverters at a frequency and/or duty cycle other than the fundamental frequency and/or duty cycle can result in voltage step down at the output of the inverters. Thus, the controller circuit can step down the output voltage of the rectifier stage comprising inverters 1006 and 1008 by operating one or more of the inverters 1006 or 1008 in a variable frequency multiplier mode other than the fundamental operating mode.

In embodiments, the controller can operate one or more of the inverters in the inverter stage in variable frequency mode and/or one or more of the inverters in the rectifier stage in variable frequency mode. By doing so, the converter circuit can achieve high efficiency over a wide range of input voltages and power and output voltages and power, depending upon the desired application.

Having described preferred embodiments, which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

What is claimed is:

1. A power converter comprising:
   an inverter stage having two or more switched inverters each configured to receive a first input from a source and produce a switched AC output power signal at a corresponding output thereof;
   two or more transformation stages each coupled to receive a switched output power signal from a corresponding output of said two or more switched inverters of said inverter stage, shape the switched output power signal, and produce a shaped power signal, said two or more transformation stages having a fundamental frequency of operation;
   a rectifier stage having two or more switched inverters coupled to receive a shaped power signal from said two or more transformation stages and convert the shaped power signal to a DC output power signal; and
   a controller circuit coupled to operate the power converter in a variable frequency multiplier mode.

2. The power converter of claim 1 wherein said controller circuit operates the power converter in a variable frequency multiplier mode by operating at least one of said inverter stage and said rectifier stage at a switching frequency corresponding to one of a fundamental of the transformation stages frequency of operation or a harmonic of the transformation stages frequency of operation.

3. The power converter of claim 1 wherein operating at least one of said inverter stage and said rectifier stage at a switching frequency corresponding to one of a fundamental or a harmonic of the transformation stages frequency of operation comprises operating at least one of said inverter stage and said rectifier stage at one of:
   a frequency which is less than a fundamental of the transformation stages frequency; or
   a frequency which is greater than a fundamental of the transformation stages frequency.

4. The power converter of claim 1 wherein said inverter stage comprises a stacked inverter.

5. The power converter of claim 1 wherein at least some of said two or more switched inverters of said inverter stage are configured to be operated in different modes.

6. The power converter claim 1 wherein said two or more transformation stages are configured to shape an output power signal by one or more of:
   performing a voltage level transformation;
   performing a waveform shaping operation; or
   providing electrical isolation.

7. The power converter of claim 1 wherein said controller circuit is configured to drive one or both of said inverter stage and said rectifier stage in a variable frequency multiplier mode.

8. The power converter of claim 1 wherein said controller circuit is configured to operate the power converter in variable frequency multiplier mode by operating at least one of said inverter stage and said rectifier stage in a variable frequency multiplier mode, or by operating both of said inverter stage and said rectifier stage in a variable frequency multiplier mode.

9. The power converter of claim 1 wherein said controller circuit is configured to operate one or more of said two or more switched inverters of said inverter stage at a frequency corresponding to a fundamental frequency of said transformation stages frequency of operation mode and one or more of said two or more switched inverters of said inverter stage at a frequency corresponding to a variable frequency multiplier mode.

10. The power converter of any of claim 1 wherein said controller circuit is configured to operate one or more of said switched inverters of said inverter stage in a fundamental mode while operating one or more of said switched inverters of said rectifier stage in a variable frequency multiplier mode.

11. The power converter of claim 1 wherein said controller circuit is configured to operate the power converter in the variable frequency multiplier mode by switching at least one of said two or more switched inverters of said rectifier stage at a frequency that is a multiple of the fundamental frequency of said transformation stages.

12. The power converter of claim 1 wherein said controller circuit is configured to operate the power converter in the variable frequency multiplier mode by switching at least one of said two or more switched inverters of said inverter stage at a duty cycle that reinforces a harmonic of the operating frequency at the inverter output.

13. The power converter of claim 1 wherein said controller circuit is configured to operate the power converter in the variable frequency multiplier mode by one or more of:
   adding a time delay between switching of said two or more switched inverters in said inverter stage; and adding a time delay between switching one or more switched inverters in said rectifier stage.

14. The power converter of claim 1 wherein said controller circuit operates at least one of said two or more switched inverters in said inverter stage at a fundamental frequency that is one-half of a desired output frequency to achieve a frequency doubler mode of operation.

15. The power converter of claim 1 wherein said controller circuit is configured to operate at least one of said inverter stage and said rectifier stage at a switching frequency corresponding to one of a fundamental or a harmonic of the transformation stages frequency of operation such that a switching frequency and duty ratio of switching elements in at least one of said inverter stage and said rectifier stage change without altering a frequency at which power is transferred through said transformation stages.

16. The power converter of claim 1 wherein said controller circuit is configured to operate the power converter in variable frequency multiplier mode by operating both of said inverter stage and said rectifier stage in a variable frequency multiplier mode.

17. The power converter of claim 16 wherein said controller is configured to operate said rectifier stage at one of:
   a frequency which is less than a fundamental of the transformation stages frequency; or
   a frequency which is greater than a fundamental of the transformation stages frequency.

* * * * *

UNITED STATES PATENT AND TRADEMARK OFFICE
CERTIFICATE OF CORRECTION

PATENT NO. : 9,853,550 B2
APPLICATION NO. : 14/435914
DATED : December 26, 2017
INVENTOR(S) : David J. Perreault et al.

It is certified that error appears in the above-identified patent and that said Letters Patent is hereby corrected as shown below:

Column 1, Line 27, delete "though" and replace with --through--.

Column 1, Line 29, delete "though" and replace with --through--.

Column 2, Line 10, delete "V-410" and replace with --V – 410--.

Column 2, Line 16, delete "module" and replace with --modules--.

Column 2, Line 22, delete "With" and replace with --with--.

Column 3, Line 55, delete "of characteristics" and replace with --characteristics--.

Column 5, Line 63, delete "ratios such" and replace with --ratios – such--.

Column 7, Line 50, delete "bad" and replace with --load--.

Column 9, Line 4, delete "FIG." and replace with --FIGs.--.

Column 9, Lines 58 to 59, delete "cancel/abort" and replace with --cancellation--.

Column 10, Line 28, delete "forming a VFX rectifier)" and replace with --(i.e., forming a VFX rectifier)--.

Column 10, Line 37, delete "pardons" and replace with --portions--.

Column 10, Line 54, delete "some" and replace with --same--.

Column 10, Line 57, delete "half bridge" and replace with --half-bridge--.

Column 10, Line 67, delete "FIGs. 12 and 12" and replace with --FIGs. 12A and 12B--.

Signed and Sealed this
Eighth Day of January, 2019

Andrei Iancu
*Director of the United States Patent and Trademark Office*